United States Patent [19]

Matsumoto et al.

[11] Patent Number: 4,506,757
[45] Date of Patent: Mar. 26, 1985

[54] TRACK TYPE VEHICLE PROVIDING FOR READY DISMOUNTING AND REMOUNTING OF POWER TRAIN COMPONENTS

[75] Inventors: Takeshi Matsumoto, Hirakata; Shuji Yoshida, Sakai; Katsuji Shikimi, Hirakata, all of Japan

[73] Assignee: Kabushiki Kaisha Komatsu Seisakusho, Tokyo, Japan

[21] Appl. No.: 505,705

[22] Filed: Jun. 20, 1983

[30] Foreign Application Priority Data

Jun. 24, 1982 [JP] Japan ................................ 57/107612

[51] Int. Cl.³ ................................................ B60K 9/00
[52] U.S. Cl. ..................................... 180/294; 105/133; 180/6.7; 180/70.1; 180/295; 180/298; 248/605; 280/781
[58] Field of Search ................. 180/6.7, 6.2, 291, 294, 180/295, 296, 298, 299, 297, 89.1, 69.1, 70.1, 908; 280/781, 783; 105/133; 248/544, 634, 605, 607, 671, 675

[56] References Cited

U.S. PATENT DOCUMENTS

| 1,571,035 | 1/1926 | Aitken | 180/298 X |
| 2,094,290 | 9/1937 | Brobson | 180/291 |
| 2,720,931 | 10/1955 | Thannhauser | 180/298 |
| 4,276,952 | 7/1981 | Kuhfuss, Jr. et al. | 180/294 |
| 4,320,814 | 3/1982 | Middelhoven | 180/294 |

FOREIGN PATENT DOCUMENTS 655489 12/1928 France ................................ 180/294

Primary Examiner—Joseph F. Peters, Jr.
Assistant Examiner—Mitchell J. Hill
Attorney, Agent, or Firm—Frost & Jacobs

[57] ABSTRACT

A tracked vehicle designed to allow easy dismounting, as for servicing, of a power train assembly comprising a torque converter, a transmission, and a steering mechanism detachably joined together. Having its input shaft coupled to the output shaft of an engine via a joint, the torque converter is supported on a pair of main vehicle frame members via a removable support member extending therebetween. The steering mechanism is mounted to the main frame members both detachably and for pivotal motion about the aligned axis of its pair of output shafts separably connected to respective retractable input shafts of final drives secured externally to the main frame members. Thus the power train assembly is either wholly dismountable from the vehicle frame or pivotable relative to the vehicle frame about the aligned output shafts of the steering mechanism for dismounting only the torque converter and the transmission.

10 Claims, 9 Drawing Figures

TRACK TYPE VEHICLE PROVIDING FOR READY DISMOUNTING AND REMOUNTING OF POWER TRAIN COMPONENTS

BACKGROUND OF THE INVENTION

This invention relates to vehicles, to off-highway self-propelled vehicles and, in particular, to track-laying vehicles. More particularly the invention pertains to a track type vehicle with provisions for the ready dismounting and remounting of a series of power train components controllably transmitting the output torque of the engine to a pair of final drives.

The power train of tracked vehicles such as earthmovers normally comprises a hydraulic torque converter, a transmission, and a steering system or mechanism. The torque converter has heretofore been usually directly bolted or otherwise fastened to the flywheel housing of the engine mounted on the vehicle frame adjacent the forward end thereof. Coupled to the output shaft of the torque converter, the transmission has been fastened to the vehicle frame. The steering mechanism comprises a cross-shaft laid transversely of the vehicle and coupled to the transmission output shaft via bevel gearing, and a pair of steering clutches and brakes acting between the cross-shaft and a pair of aligned output shafts connected to the respective final drives. All these components of the steering mechanism have so far been mounted within a boxlike main housing formed at the rear end of, and forming an integral part of, the vehicle frame.

Thus, in short the torque converter, transmission, and steering mechanism have so far been separately mounted on the vehicle frame. Such separate mounting of the power train components has caused much difficulties in dismounting them, as for servicing.

The dismounting and remounting of the steering mechanism in particular have been very troublesome as its working parts have all been installed within the main housing of the vehicle frame with use of threaded fastener elements. The steering clutches and brakes with their easy-to-wear friction discs, among other parts, are subject to frequent repairs. As the steering mechanism has not been quickly dismountable and remountable, much time has been wasted for its servicing, resulting in an increase in the downtime of the vehicle itself.

SUMMARY OF THE INVENTION

The present invention overcomes the noted difficulties of the prior art and makes materially easier and quicker the dismounting and remounting of power train components from and on the frame of a tracked vehicle.

Broadly the invention may be summarized as a track type vehicle comprising a frame having a pair of spaced apart main frame members extending longitudinally of the vehicle and rigidly connected to each other. The vehicle frame has an internal combustion engine mounted thereon adjacent one end thereof and a pair of final drives secured externally to the respective main frame members adjacent the other end of the frame. For controllably transmitting the rotation of the engine to the final drives a power train assembly is separably connected therebetween which comprises a series of power train components disconnectably coupled together. Among the power train components is a steering mechanism having a pair of output shafts which are axially aligned with each other about an axis extending transversely of the vehicle and which are detachably coupled to the respective final drives. The power train assembly is supported on the vehicle frame by first and second support means. The first support means detachably support the power train assembly on the frame in a position closer to the engine than to the final drives. The second support means, on the other hand, support the steering mechanism on the main frame members both detachably and for pivotal motion about the aligned axis of its output shafts.

In a preferred embodiment the power train assembly comprises a torque converter and a transmission, in addition to the steering mechanism. All these power train components have their housings fastened together to provide the unitary power train assembly. As is apparent from the foregoing summary, the power train assembly is readily dismountable as a whole from the vehicle frame as by means of a crane. Alternatively, disengaged only from the first support means, the power train assembly may be pivoted upwardly relative to the vehicle frame, also as by a crane, about the aligned axis of the output shafts of the steering mechanism. Then, with the steering mechanism suitably held against angular motion relative to the vehicle frame, only the torque converter and the transmission may be individually disconnected from the steering mechanism and dismounted from the vehicle frame. The remounting of the power train assembly, or of some of its components, is of course no less easy.

The above and other features and advantages of this invention and the manner of attaining them will become more apparent, and the invention itself will best be understood, from a study of the following description of a preferred embodiment illustrated in the attached drawings.

DESCRIPTION OF THE PREFERRED EMBODIMENT

Figure 1:
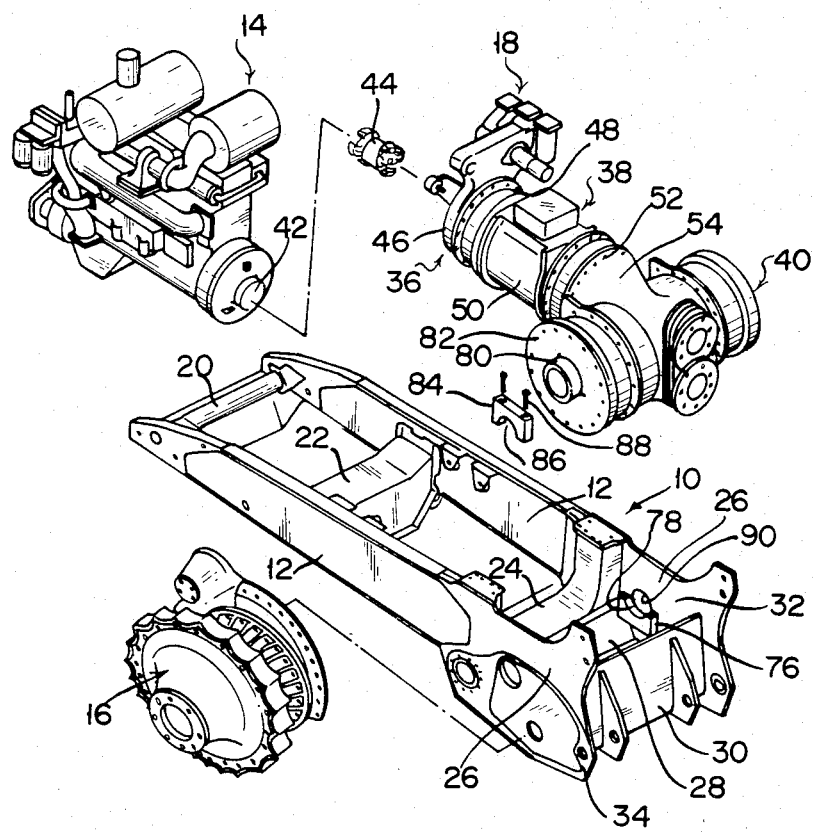
FIG. 1 is an exploded perspective view showing the essential parts of the track type vehicle constructed in accordance with the novel concepts of the invention.

A consideration of FIG. 1 will make clear the general organization of the tracked vehicle in accordance with the invention. The principal components of the vehicle are:

1. A frame 10 having a pair of main frame members 12 extending longitudinally of the vehicle in parallel spaced relation to each other.

2. An internal combustion engine 14 of any known or suitable design conventionally mounted on the vehicle frame 10 at or adjacent its front end, directed to the left in FIG. 1.

3. A pair of final drives 16, one shown, conventionally mounted to the outer surfaces of the main frame members 12 at or adjacent the rear end of the vehicle frame.

4. A power train assembly 18 dismountably connected between engine 14 and final drives 16 for controllably transmitting the rotation of the former to the latter.

The pairs of main frame members 12 of the vehicle frame are rigidly interconnected by a crossbar 20 at the front end, a central tie frame member 22, and a rear tie frame member 24. The engine 14 is mounted between the main frame members 12 in the known manner. Behind the rear tie frame member 24 the main frame members 12 are shaped into a pair of opposed, flat, vertical walls 26 rigidly interconnected by a bottom 28 and a rear end wall 30, thus defining an open-top steering compartment 32 yet to be referred to.

The vertical walls 26 at the rear ends of the main frame members 12 have mounting seats 34, one seen, formed on their outer surfaces. The pair of final drives 16 are conventionally mounted on these mounting seats 34 in alignment with each other.

The power train assembly 18 comprises, in the illustrated embodiment, the following three components separably joined to each other:

1. A hydraulic torque converter 36.
2. A transmission 38.
3. A steering mechanism 40.

The torque converter 36 has an input shaft, not seen, separably coupled to the output shaft 42 of the engine 14 via a coupling or joint 44 of conventional make. The housing 46 of the torque converter 36 is screwed or otherwise removably fastened at 48 to the housing 50 of the transmission 38. The transmission housing 50 is likewise removably fastened at 52 to the housing 54 of the steering mechanism 40. The steering housing 54 is received in the steering compartment 32 at the rear end of the vehicle frame 10. Thus, with their respective housings rigidly but separably fastened together in a row, the three power train components 36, 38 and 40 make up the streamlined power train assembly 18 which can be readily dismounted and remounted in accordance with the principles of the invention.

Figure 2:
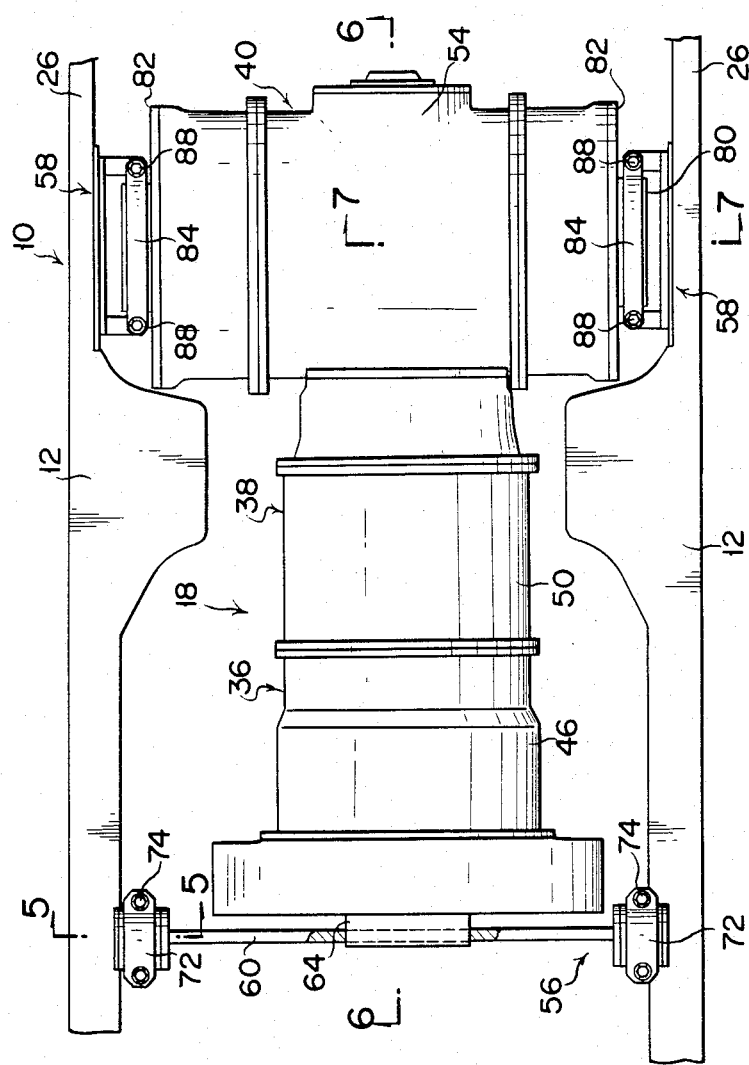
FIG. 2 is an enlarged top plan showing only the power train assembly and part of the frame in the track type vehicle of FIG. 1.
Figure 3:
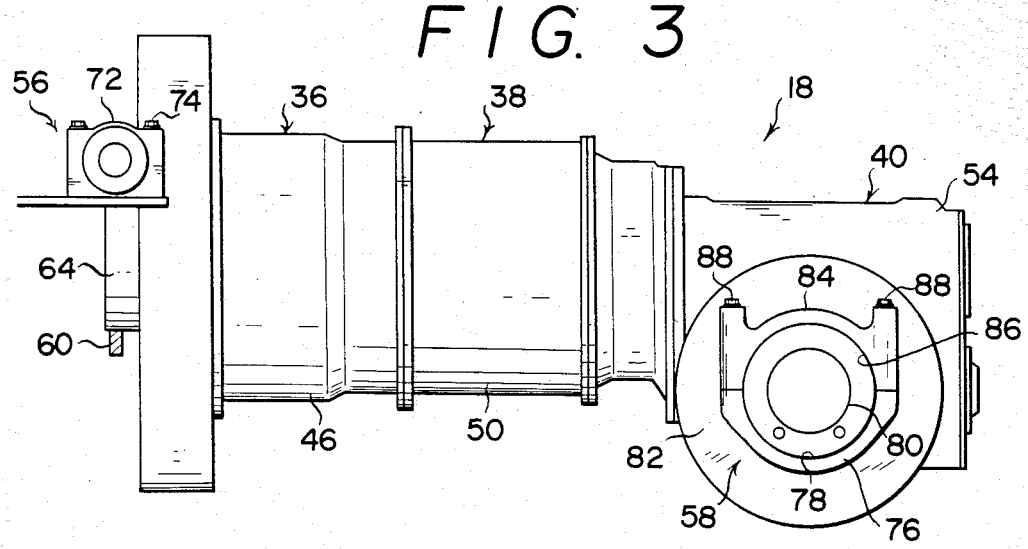
FIG. 3 is a side elevation of the power train assembly and its first support means seen in FIG. 2.
Figure 4:
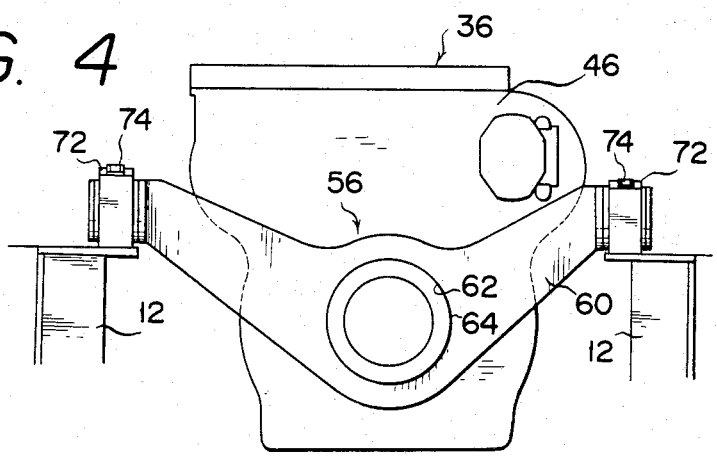
FIG. 4 is a left hand side elevation of the power train assembly and its first support means of FIG. 3.

As will be seen also from the enlarged representations of the power train assembly 18 and associated means given in FIGS. 2, 3 and 4, the power train assembly is mounted on the vehicle frame 10 via:

1. First support means 56 detachably supporting the torque converter 36 on the main frame members 12.

2. Second support means 58 supporting the steering mechanism 40 on the main frame members 12 both detachably and for pivotal motion about the axis of the steering mechanism extending transversely of the vehicle.

Figure 5:
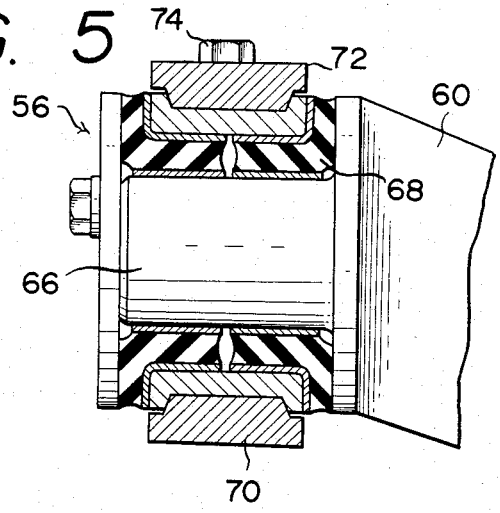
FIG. 5 is a fragmentary, enlarged section through the first support means of the power train assembly, taken along the line 5—5 of FIG. 2.

The first support means 56 include a V-shaped support member 60 having a hole 62 formed centrally therein. An annular or tubular boss 64 projecting from the torque converter housing 46 toward the engine 14 is fitted in the hole 62 in the support member 60. The boss 64 is concentric with the unshown input shaft of the torque converter 36. Extending between the pair of main frame members 12, the support member 60 has its opposite ends detachably coupled thereto by means best illustrated in FIG. 5.

Projecting horizontally from each end of the support member 60 is a stud 66 having a cushion 68 of rubber or like elastic material sleeved thereon and overlying a rest 70 on one of the main frame members 12. A removable clamp 72 is secured to the rest 70 by threaded fastener elements 74 for holding the stud 66 against the rest via the cushion 68. Thus the support member 60 is readily disengageable from the main frame members 12 on loosening the fastener elements 74. The cushions 68 serve the dual purpose of damping vibrations and allowing greater dimensional tolerances for the related parts.

Attention is now called to the details of the second support means 58 given in FIGS. 1, 2 and 3. Included are a pair of rests 76 rigidly formed on the opposed inside surfaces of the vertical walls 26 bounding the sides of the steering compartment 32. The rests 76 have semicircular recesses 78 for receiving and supporting thereon annular or tubular bosses 80 projecting from the opposite sides of the steering housing 54, or from a pair of end caps 82 closing the opposite sides of the steering housing. The bosses 80 are concentric with the output shafts of the steering mechanism, as will be detailed presently. The second support means 58 further include a pair of removable clamps 84 having semicircular recesses 86 to fit over the upper halves of the steering housing bosses 80 on the rests 76. The clamps 84 are secured to the rests 76 by threaded fastener elements 88 for holding the steering housing bosses 80 against the rests. The vertical walls 26 on the vehicle frame 10 have holes 90 formed therethrough just above, and concentrically with, the semicircular recesses 78 of the rests 76 for the passage of the input shafts of the final drives 16, also as will be explained in further detail subsequently.

With its bosses 80 thus caught between the rests 76 and clamps 84 the steering mechanism 40 is pivotable or rotatable relative to the vehicle frame 10 about the aligned axis of the bosses or of its output shafts. Of course the steering mechanism is readily disengageable from the vehicle frame by loosening the fastener elements 88 on the clamps 84.

Figure 6:
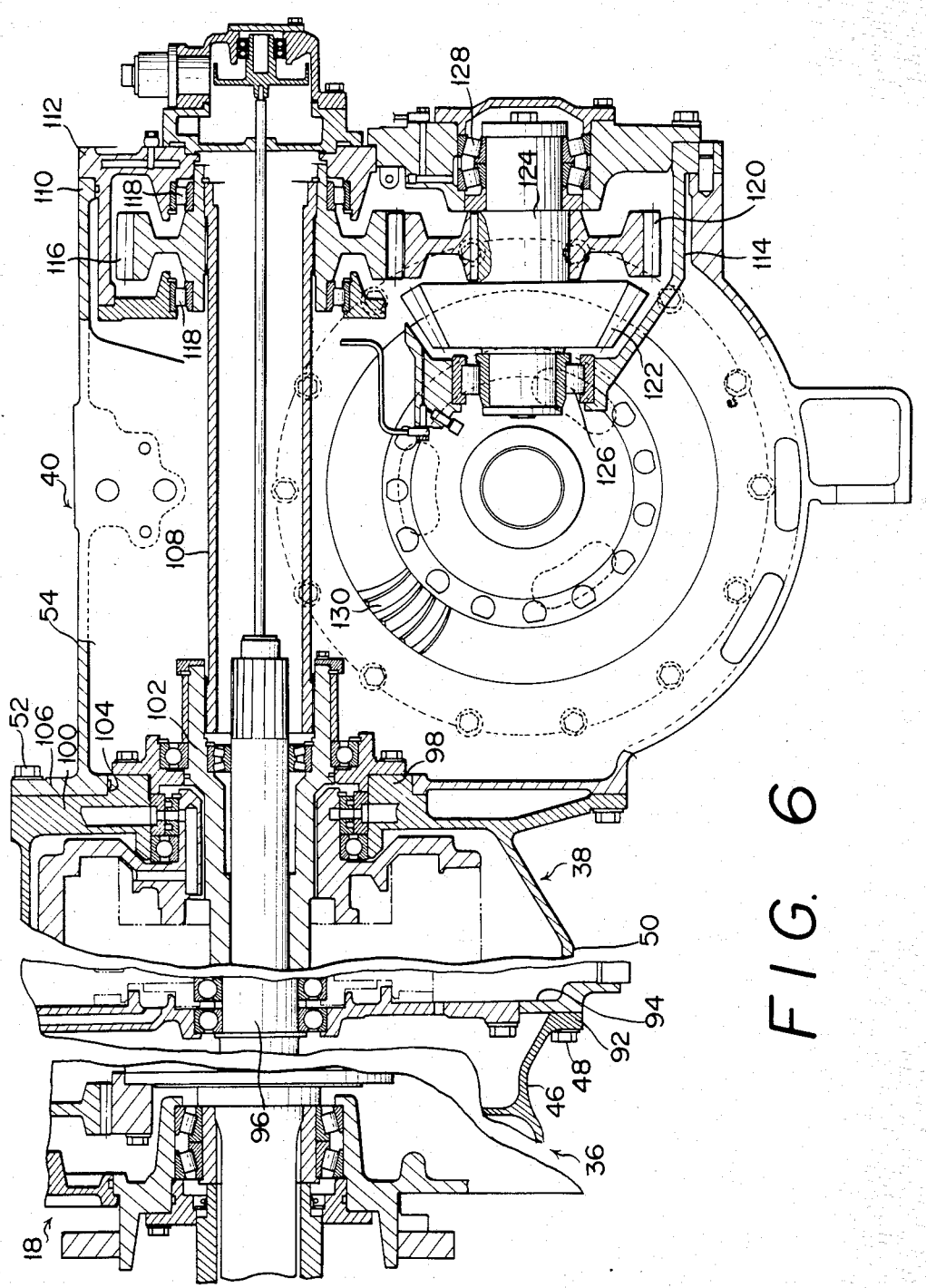
FIG. 6 is an enlarged, vertical, longitudinal section, partly broken away for illustrative convenience, through the power train assembly, taken along the line 6—6 of FIG. 2.
Figure 7:
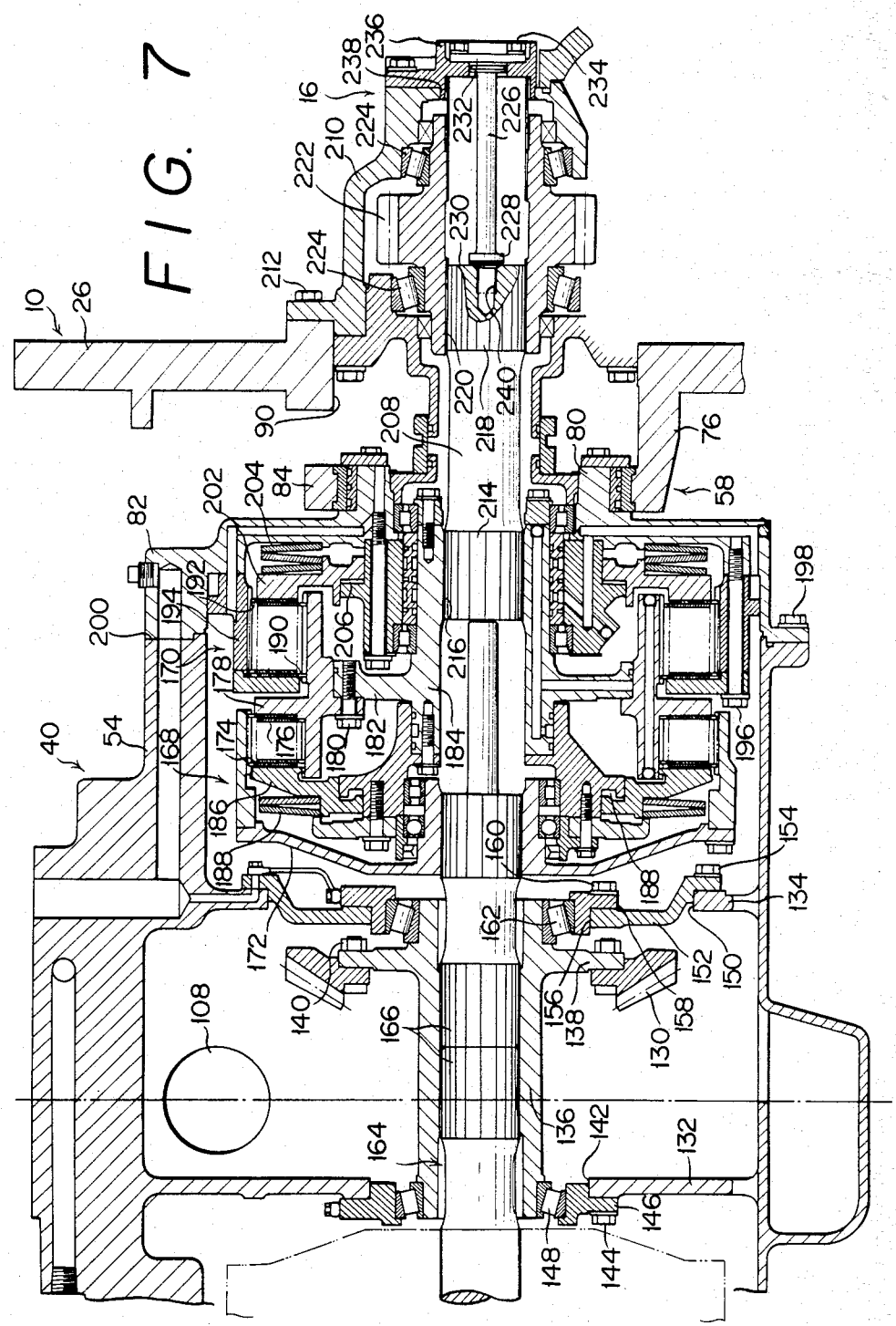
FIG. 7 is an enlarged, fragmentary, vertical, longitudinal section through the steering mechanism forming a part of the power train assembly, taken along the line 7—7 of FIG. 2.

FIGS. 6 and 7 are detailed sectional illustrations of the power train assembly 18 mounted on the vehicle frame as in the foregoing. With reference first to FIG. 6 it will be discerned that the housing 46 of the torque converter 36 has a flange 92 on its rear end which is screwed at 48 to the front end wall 94 of the housing 50 of the transmission 38. The output shaft 96 of the torque converter 36 rotatably extends through the front end wall 94 of the transmission to serve as the input shaft of the transmission 38.

The transmission housing 50 has an annular boss 98 formed on its rear end wall 100 so as to concentrically surround a hollow transmission output shaft 102. The boss 98 is closely engaged in a hole 104 in the front end wall 106 of the steering housing 54. Further the transmission housing 50 and steering housing 54 are screwed together at 52. The hollow output shaft 102 of the transmission 38 is fitted over and splinedly engaged with the input shaft 108 of the steering mechanism 40. All the above recited shafts 96, 102 and 108 are in line in the longitudinal direction of the vehicle.

Removably mounted to the rear end wall 110 of the steering housing 54 are an upper gear housing 112 and lower gear housing 114. The upper gear housing 112 accommodates a driving spur gear 116 which is rotatably supported thereby via a pair of bearings 118 and which is splinedly mounted on the input shaft 108. The lower gear housing 114, on the other hand, receives a driven spur gear 120 and bevel pinion 122. Both spur gear 120 and bevel pinion 122 are fixedly mounted on a spindle 124 rotatably supported by the lower gear housing 114 via two bearings 126 and 128 and laid parallel to the input shaft 108. The spur gear 120 meshes with the driving spur gear 116 whereas the bevel pinion 122 meshes with a bevel gear 130.

FIG. 7 reveals further details of the steering mechanism 40. The steering housing 54 integrally includes a pair of vertical bearing walls 132 and 134 spaced from each other transversely of the vehicle. Rotatably supported by these bearing walls are a hollow shaft 136 extending transversely of the vehicle and having a flange 138 to which is fastened at 140 the aforesaid bevel gear 130. Thus the hollow shaft 136 is driven from the input shaft 108 via the intermeshing spur gears 116 and 120 and bevel gears 122 and 130.

For rotatably supporting the hollow shaft 136 the left hand bearing wall 132 has a relatively small diameter bore 142 formed therein. To the edge of the left hand bearing wall 132 bounding the bore 142 there is fastened at 144 a bearing support 146 carrying a bearing 148. The right hand bearing wall 134 has a larger diameter bore 150 formed therein to allow the passage of the bevel gear 130 during the assemblage and disassemblage of the steering mechanism. The larger diameter bore 150 is partly closed by a mounting disc 152 which is secured to the bearing wall 134 by threaded fastener elements 154. The mounting disc 152 is itself bored centrally at 156. Mounted in this bore 156 is a bearing support 158 fastened at 160 to the mounting disc 152. The bearing support 158 carries a bearing 162. The hollow shaft 136 has its opposite ends journaled in the pair of bearings 148 and 162.

Splinedly mounted in the hollow shaft 136 for joint rotation therewith is a cross-shaft 164 having a pair of segments 166 in end-to-end abutment against each other. The segmented cross-shaft 164, however, can be considered unitary for the purposes of the invention.

The cross-shaft 164 projects beyond the opposite extremities of the hollow shaft 136 to be coupled to the pair of final drives 16, one shown in FIG. 7, fastened externally to the vertical walls 26 of the main frame members 12. Interposed between the opposite ends of the cross-shaft 164 and the final drives 16 are a pair of steering clutches 168 and a pair of steering brakes 170. Since both steering clutches 168 and both steering brakes 170 are identical in construction, only one steering clutch and one steering brake will be described in detail in conjunction with the associated one of the final drives 16, it being understood that the same description substantially applies to the other steering clutch and steering brake, as well as to the other final drive.

Projecting out of the hollow shaft 136, one end of the cross-shaft 164 has splinedly mounted thereon an input flange 172 of the representative steering clutch 168. The input flange 172 carries a set of driving plates 174, arranged alternately with a set of driven plates 176 on an output flange 178 which is fastened at 180 to a flange 182 of a hollow output shaft 184. Acting on the driving plates 174 is a pressure plate 186 biased by a disc spring 188 to cause frictional engagement of the driving plates with the driven plates 176. The pressure plate 186 is to be moved axially against the bias of the spring 88 upon delivery of pressurized hydraulic fluid to a fluid chamber 188.

The representative steering brake 170 comprises a set of rotary plates 190 on the output flange 178 and a set of nonrotary plates 192 on a stationary flange 194, with the rotary and nonrotary plates arranged alternately. The stationary flange 194 is secured at 196 to the aforesaid end cap 82 which is removably fastened at 198 to an open end 200 of the steering housing 54. A pressure plate 202 is biased by a disc spring 204 to cause frictional engagement of the rotary 190 and nonrotary 192 plates. The pressure plate 202 is movable against the force of the spring 204 by pressurized fluid supplied to a fluid chamber 206.

As has been stated, each end cap 82 of the steering housing 54 has the annular boss 80 protruding outwardly therefrom in concentric relation to the pair of aligned hollow output shafts 184 of the steering mechanism 40. The boss 80 is rotatably caught between the rest 76 and clamp 84 of the second support means 58.

Since it is desired that the steering mechanism 40 be readily dismountable from the vehicle frame 10, besides being pivotable relative to the same, each hollow output shaft 184 of the steering mechanism is coupled to one final drive 16 via a retractable input shaft 208 of the latter. The representative final drive 16 of FIG. 7 has a housing 210 fastened at 212 to the outer surface of one of the opposed vertical walls 26 of the vehicle frame 10 bounding the sides of the open-top steering compartment 32 best seen in FIG. 1. Normally projecting inwardly of the vehicle frame 10 out of the final drive housing 210, the final drive input shaft 208 has one end portion 214 engaged in the hollow steering output shaft 184 via straight splines 216. Another end portion 218 of the final drive input shaft 208 is engaged, also via straight splines 220, in a hollow final drive input pinion 222 rotatably mounted in the final drive housing 210 via bearings 224.

For normally holding the final drive input shaft 208 projecting out of the final drive housing 210 into engagement with the steering output shaft 184, a retainer rod 226 is provided which has a head 228 on one end abutting against an end face 230 of the final drive input shaft. The other end of the retainer rod 226 has a flange 232 which is fastened at 234 to an openable cover 236 closing an opening 238 defined in the final drive housing 210 in alignment with the final drive input shaft 208. The end face 230 of the final drive input shaft 208 has a tapped hole 240 created therein. This tapped hole is intended for use in retracting the final drive input shaft 208 into the final drive housing 210, as will be explained in further detail subsequently.

No further details of the final drives 16 are shown because they can be conventional. Suffice it to say that the final drives comprise reduction gears or mechanisms between the steering mechanism 40 and the unshown sprockets of the vehicle.

Figure 8:
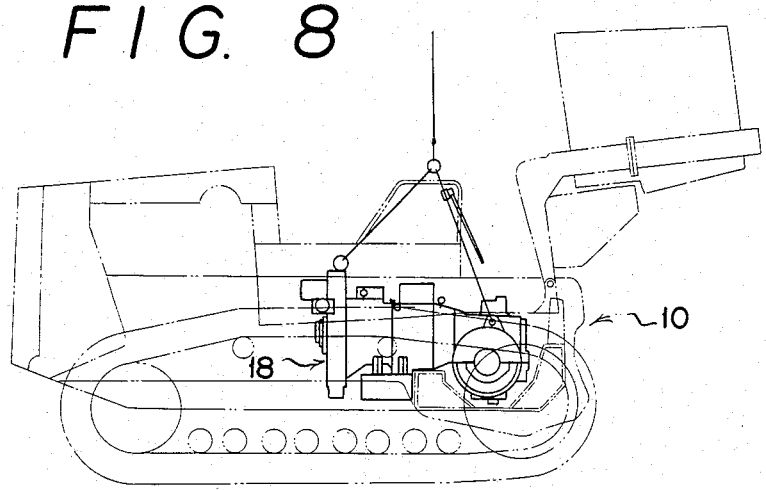
FIG. 8 is a diagrammatic side elevation of the track type vehicle explanatory of a mode of dismounting the power train assembly.
Figure 9:
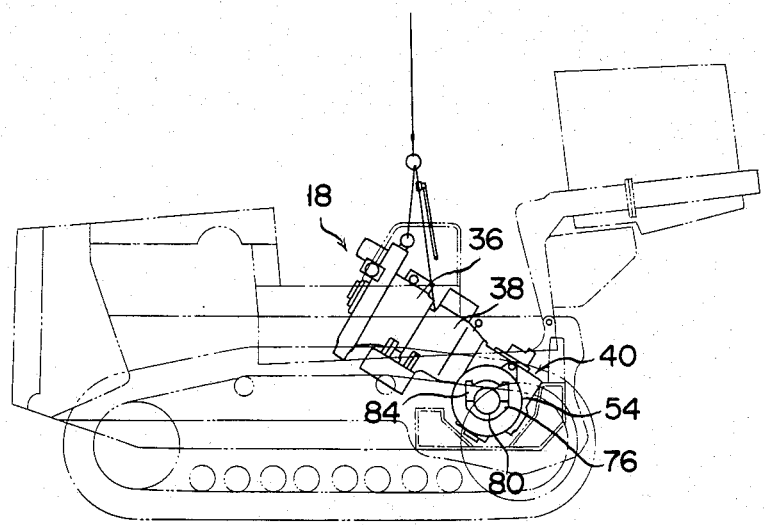
FIG. 9 is a view similar to FIG. 8 but explanatory of another mode of dismounting the power train assembly.

Such being the construction of the tracked vehicle in accordance with the invention, the power train assembly 18 can be either wholly dismounted from the vehicle frame 10, as in FIG. 8, or pivotable about the aligned axis of the pair of output shafts 184 of the steering mechanism 40, as in FIG. 9, for individually dismounting the power train components other than the steering mechanism.

For wholly dismounting the power train assembly 18 as in FIG. 8 the covers 236 of FIG. 7 may be removed from both final drive housings 210. Then a threaded rod may be inserted into and through the opening 238 in each final drive housing 210 and screwed into the tapped hole 240 in each retractable final drive input shaft 208. Then, by a pull on the threaded rod, the final drive input shaft 208 may be retracted into the final drive input pinion 222, out of engagement with one of the steering output shafts 184. Then the clamps 72 of the first support means 56 and the clamps 84 of the second support means 58 may both be loosened and removed from the respective rests 70 and 76. Now the complete power train assembly 18 can be craned up from the vehicle frame 10 as pictured in FIG. 8.

All that is required for pivoting the power train assembly 18 as in FIG. 9 is to loosen and remove the clamps 72 of the first support means 56 from the rests 70. Then the power train assembly can be craned for pivotal motion about the pair of steering housing bosses 80 rotatably caught between rests 76 and clamps 84. Thereafter, with the steering housing 54 suitably locked against angular motion relative to the vehicle frame 10, only the torque converter and transmission 38 may be disconnected from the steering mechanism 40 and dismounted.

While one embodiment of the invention has been shown and described herein, it will be understood that it is illustrative only and not to be taken as a definition of the scope of the invention, reference being had for this purpose to the claims which follow.

What is claimed is:

1. A track type vehicle comprising:
   (a) a frame including a pair of spaced apart main frame members extending longitudinally of the vehicle, the main frame members being rigidly connected to each other;
   (b) an internal combustion engine mounted on the frame adjacent one end thereof;
   (c) a pair of final drives secured externally to the respective main frame members adjacent the other end of the frame;
   (d) a power train assembly separably connected to the engine for controllably transmitting the rotation thereof to the final drives, the power train assembly comprising a series of power train components, including a steering mechanism, separably connected to each other, the steering mechanism having a pair of output shafts in alignment with each other about an axis extending transversely of the vehicle, the output shafts of the steering mechanism being separably connected to the respective final drives;
   (e) first support means for detachably supporting the power train assembly on the frame in a position closer to the engine; and
   (f) second support means for supporting the steering mechanism of the power train assembly on the main frame members both detachably and for pivotal motion about the aligned axis of its output shafts;
   (g) whereby the power train assembly is either wholly dismountable from the frame or pivotable relative to the frame about the aligned axis of the output shafts of the steering mechanism for individually dismounting the power train components other than the steering mechanism.

2. The track type vehicle of claim 1 wherein the power train assembly comprises, in addition to the steering mechanism:
   (a) a hydraulic torque converter separably connected to the engine; and
   (b) a transmission separably connected between the torque converter and the steering mechanism.

3. The track type vehicle of claim 2 wherein the torque converter has a boss projecting therefrom toward the engine and wherein the first support means comprises:
   (a) a support member extending between the pair of main frame members and having an opening defined centrally therein for receiving the boss of the torque converter;
   (b) a pair of rests on the main frame members for supporting the opposite ends of the support member thereon; and
   (c) a pair of removable clamps for holding the opposite ends of the support member against the rests.

4. The track type vehicle of claim 3 wherein the first support means further comprises a pair of cushions sleeved upon the opposite ends of the support member.

5. The track type vehicle of claim 1 wherein the steering mechanism of the power train assembly comprises:
   (a) a steering housing disposed between the pair of main frame members; and
   (b) a pair of annular bosses projecting from the opposite sides of the steering housing in concentric relation to the output shafts of the steering mechanism; and wherein the second support means comprises:
   (a) a pair of rests on the main frame members for rotatably supporting the annular bosses of the steering housing thereon; and
   (b) a pair of removable clamps for rotatably holding the annular bosses of the steering housing against the rests.

6. The track type vehicle of claim 1 wherein the output shafts of the steering mechanism are hollow and wherein each final drive comprises:
   (a) a final drive housing secured to one of the main frame members;
   (b) a hollow pinion rotatably mounted in the final drive housing;
   (c) an input shaft splinedly engaged in the hollow pinion and normally projecting therefrom to be splinedly engaged in one of the hollow output shafts of the steering mechanism, the input shaft being moved into the hollow pinion out of engagement with said one of said output shafts of the steering mechanism; and
   (d) retainer means for normally holding the input shaft in engagement with the output shaft of the steering mechanism.

7. The track type vehicle of claim 6 wherein the final drive housing has an opening defined therein in alignment with the input shaft and wherein the retainer means of each final drive comprises:
   (a) a cover openably closing the opening in the final drive housing; and
   (b) a retainer rod anchored at one end to the cover and abutting at the other end on an end face of the input shaft.

8. The track type vehicle of claim 6 wherein the input shaft of each final drive has a tapped hole formed in an end face thereof to facilitate retraction into the hollow pinion.

9. The track type vehicle of claim 1 wherein the steering mechanism comprises:
 (a) a steering housing detachably and pivotably supported between the pair of main frame members by the second support means;
 (b) an input shaft within the steering housing arranged longitudinally of the vehicle;
 (c) a cross-shaft within the steering housing arranged transversely of the vehicle and adapted to be driven by the input shaft, the cross-shaft lying between the pair of output shafts in axial alignment therewith;
 (d) a pair of steering clutches connected one between each output shaft and the cross-shaft; and
 (e) a pair of steering brakes connected one between each output shaft and the steering housing.

10. The track type vehicle of claim 9 wherein the frame is adapted to provide an open-top steering compartment for accommodating the steering mechanism.

* * * * *